Aug. 29, 1967

J. W. CRANE ETAL 3,338,158

PELLETING DEVICE

Filed Oct. 3, 1963

INVENTORS.
JACK W. CRANE
JOHN P. TARBOX

BY

Walter V. Wright

AGENT

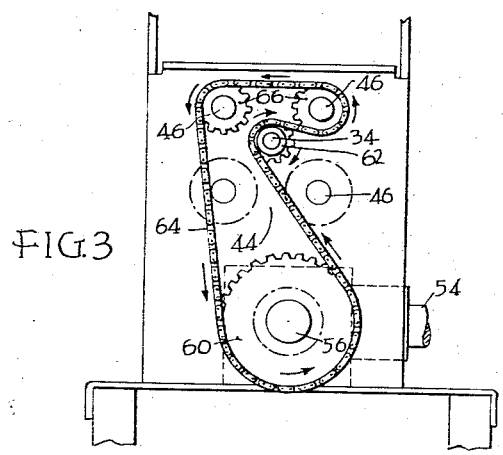
FIG.3
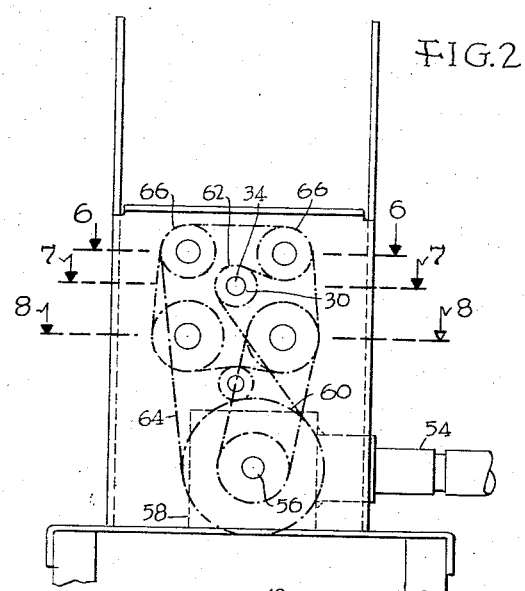
FIG.2
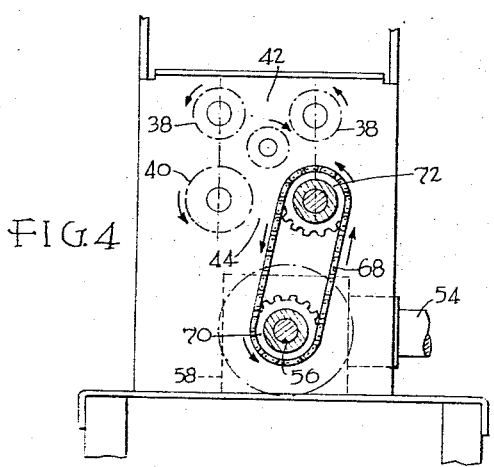
FIG.4
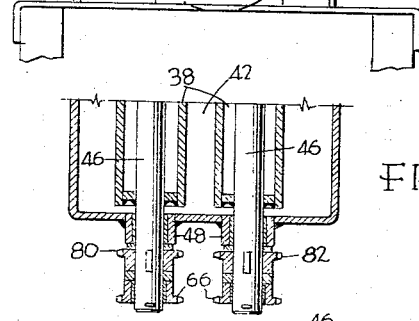
FIG.6
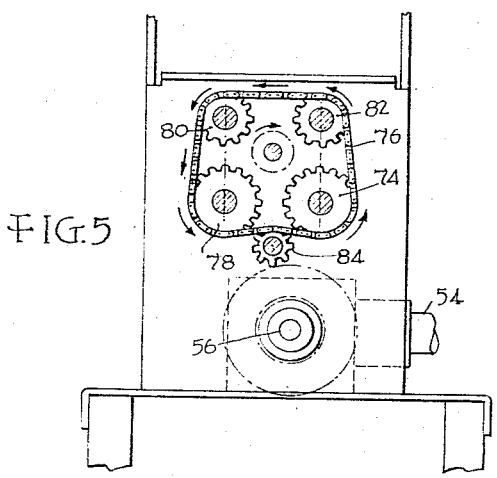
FIG.5
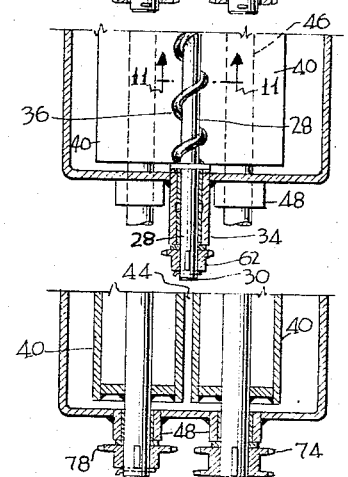
FIG.7
FIG.8
INVENTORS.
JACK W. CRANE
JOHN P. TARBOX
BY Walter V. Wright
AGENT Aug. 29, 1967  J. W. CRANE ETAL  3,338,158
PELLETING DEVICE
Filed Oct. 3, 1963  3 Sheets-Sheet 3
FIG. 9
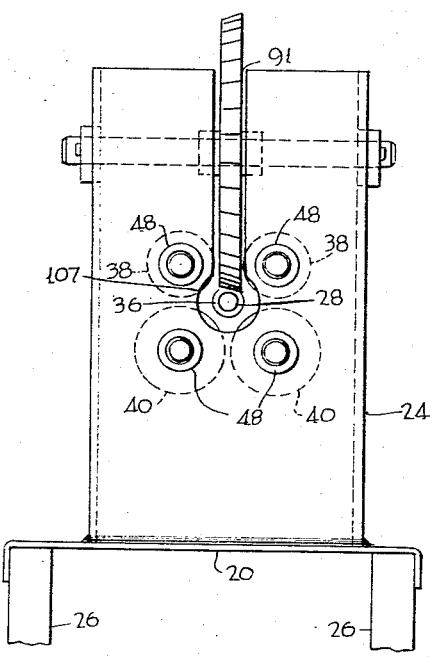
FIG. 10
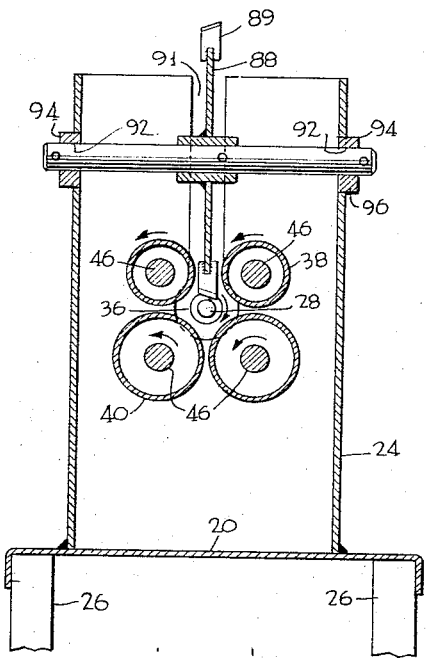
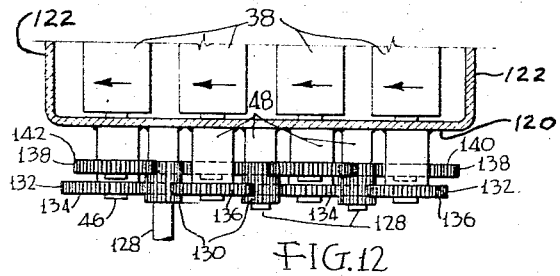
FIG. 12
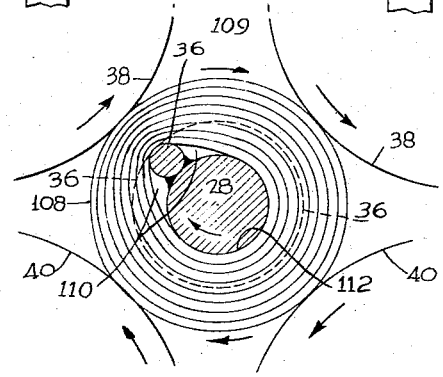
FIG. 11
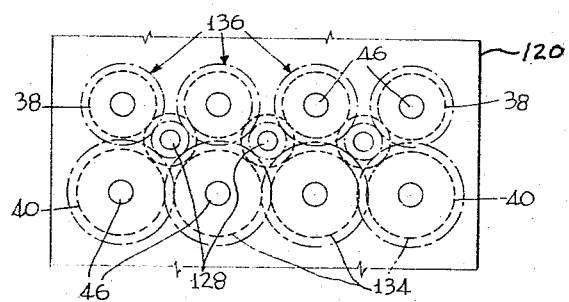
FIG. 13
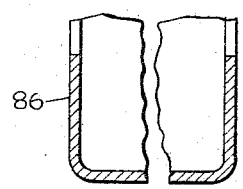
FIG. 14
INVENTORS.
JACK W. CRANE
JOHN P. TARBOX
BY  *Walter V. Wright*
AGENT United States Patent Office 3,338,158
Patented Aug. 29, 1967

3,338,158
PELLETING DEVICE
Jack W. Crane, New Holland, and John P. Tarbox, Philadelphia, Pa., assignors to Sperry Rand Corporation, New Holland, Pa., a corporation of Delaware
Filed Oct. 3, 1963, Ser. No. 306,198
5 Claims. (Cl. 100—86)

This invention comprehends both a method and a machine. They have been devised for the purpose of converting hay or similar animal feed from the form in which it has been field mown into the form of relatively high density wafers or pellets of a form and size individually acceptable and comfortably receivable in whole in the mouths of the animals for mastication. It is preferred to call the product "wafer" because the method and machine are especially adapted to give the product a "wafer like" form, and while either term may be used, the term wafer will be used in the specification and its appended claims.

The method and the machine are of those classes of inventions for the same or similar purposes in which a wrapping torque is applied to the material. As it is wrapped it is formed into the shape of an elongated hay roll of relatively small diameter, then removed from the wrapping torque, in this form subsequently firmed and stabilized, and finally severed into the short axial lengths desired for the product. Earlier such methods and machines have been lacking in efficiency, and in uniformity of size and physical qualities desired for the products. This has been outstandingly due to the existence of undesirable time intervals and sequences between the several operations. In other words there has existed untoward and inexact co-ordination between operations.

This method and this machine are devised to eliminate these shortcomings. In its broadest aspect the method consists outstandingly in continuously axially progressing the hay roll from its forming operation under wrapping torque to and into its firming operation through application of axial thrust continuously to a peripheral surface of the roll. Contributing auxiliary features of the method are the application of the thrust to an interior periphery of the roll, approximate limitation of its application to the forming operation, feeding the material to be operated upon continuously throughout the forming operation at as nearly uniform rate as practicable thereby to insure a substantially uniform axial progression of the formed hay roll, and severing the firmed roll into wafers of uniform axial thickness (or length) at a rate proportional to the rate of its axial progression at or near the close of the firming operation.

This machine in common with some other machines of its class includes such elements as an elongated wrapping spindle, a circumscribing annular series of forming and firming rolls, driving means for the spindle, feeding means, and wafer severing means. However in this machine each of these elements is specially constructed, arranged, augmented and co-ordinated in the relative movements so as to carry out the advantageous method above described. The spindle within the forming zone of the rolls is provided with a helical formation about which the hay is wrapped, and both the rolls and the spindle are power driven, but at differential speeds, the rolls being driven at considerably less speed than the spindle. As a result, the helical formation exerts, as long as adequate hay is fed to the machine, a continuous axial thrust upon the inner periphery of the hay roll and continuously progresses the roll as fast as formed toward and into the firming zone of the rolls. The circumscribing rolls have command of the relative r.p.m. between the spindle and the hay roll.

Other features of the method are practiced by limiting the length of the helical formation, by combining with the foregoing elements hay feeding, and wafer severing means, which by virtue of their particular construction, arrangement and reactions with the other elements of the machine, carry out the remaining features of the method. For example a cut metering device of the traveling shears type is juxtaposed to the completely firmed end of the hay roll and actuated in its cut metering operations by the movement of the hay roll against its penetrating cutting blades.

Aside from the features of the machine directed especially to the carrying out of the method, other objects have been constructions and organizations of parts especially adapting the invention for embodiment in a field machine of a lessened number of parts, minimum vibration during operation, increased overall efficiency and the lowered power consumption (achieved in large part through use of the method) greater ease of and less required lubrication, lowered maintenance costs, and greater durability. Yet other achievements of the machine will be set forth in the course of the description.

The accompanying drawings show in detail a one spindle experimental unit of the machine as it has been built, proven and demonstrated, but they also show in partial and semi-diagrammatic figures how a number of such units are to be combined to operate in bank to enlarge the capacity of the machine as desired.

FIG. 2 is an elevation of the power driving end;

FIG. 3 is a similar elevation of the driving means for the wrapping spindle as viewed from the plane indicated 3—3 in FIG. 1;

FIG. 4 is a like elevation of the power connection of one of the forming and firming rolls from plane 4—4 of FIG. 1;

Figure 1:
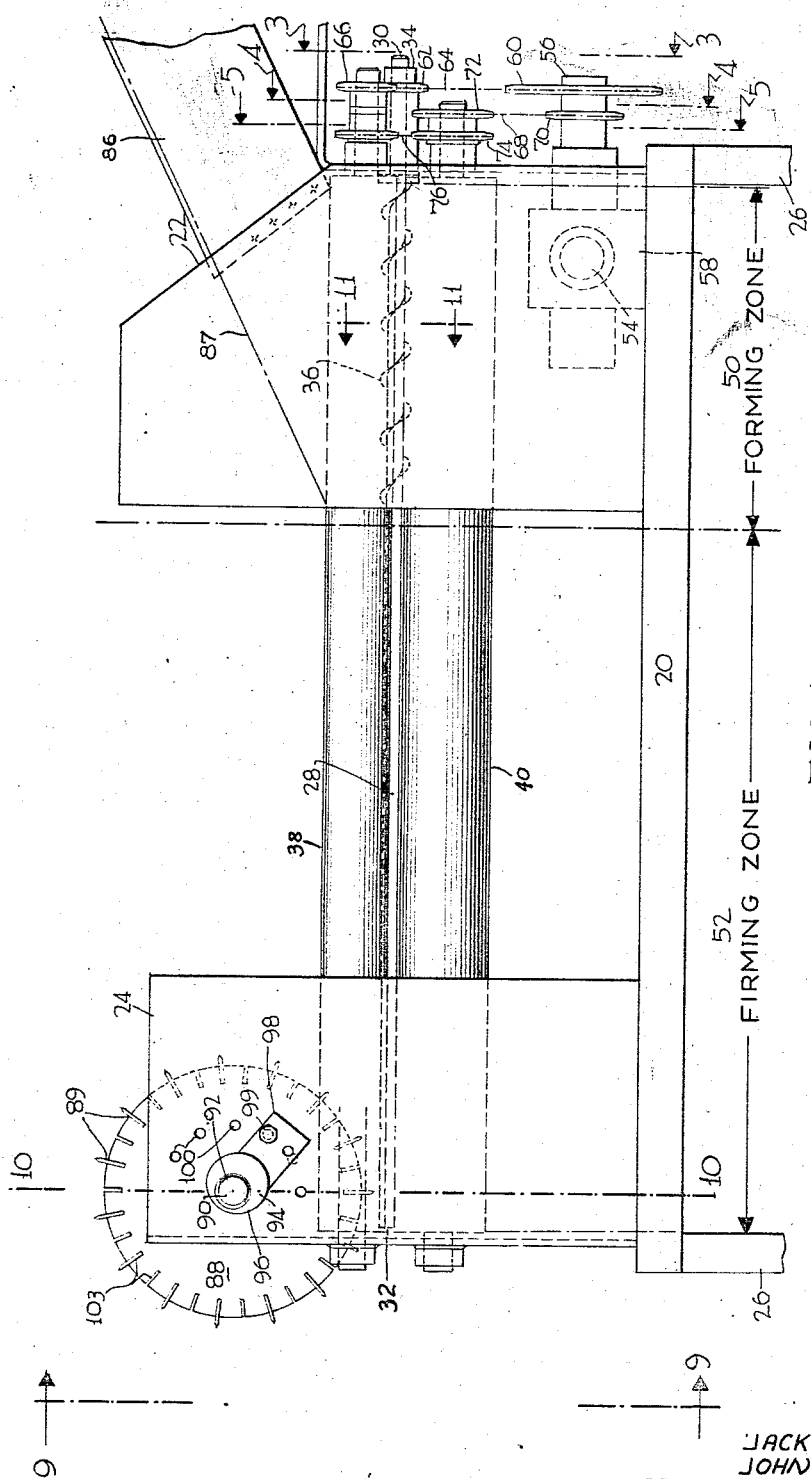
FIG. 1 is a side elevation of the unit mounted upon a stationary base.

FIG. 5 also a like elevation from plane 5—5 of FIG. 1 showing drive of the remaining rolls as derived from the one;

FIGS. 6, 7 and 8 are partial horizontal sections respectively taken on lines 6, 7 and 8 of FIG. 2 and showing in detail the relationships of various spindle and roll bearings, of spindle and rolls, and of the various gears through which the driving connections traced in FIGS. 3 to 5 are effected;

FIG. 9 is an end elevation of the end of the unit opposite the driving end of FIG. 2;

FIG. 10 is a vertical section on the line 10—10 of FIG. 1 taken through the wafer severing means appearing in FIG. 9;

FIG. 11 is an enlarged cross section of the wrapping spindle, showing also diagrammatically its relationship to the turns of wrapped and formed hay roll which surrounds it and by tangential arcs their relationship to the elements mentioned. The view may be considered such as would be taken on a line such as 11—11 of FIGS. 1 and 7;

FIGS. 12 and 13 are respectively partial plan and elevation views of the driving end of the combination of a number of the units such as detailed in FIGS. 1 to 11 into such a bank of units as it is proposed to use in a machine of great capacity; and FIG. 14 is a transverse section through the feeding device.

Referring now to the drawings 20 is the long base of the unit, while 22 and 24 are respectively front and rear vertically extending U-shaped frame members erected upon opposite ends of the base 20 with the open sides of the U sections facing each other. The end walls of the U's support spindle and roll bearings in longitudinal alignment with each other, while the side walls not only brace the end walls but also serve as support for the auxiliary mechanisms and devices such as those provided for hay feeding and distributing, and wafer severing. Temporary ground support for this frame work is afforded by legs 26.

The rotatable hay wrapping spindle means is designated 28, its bearing supported driving end 30, and its terminal free end 32. The supporting bearing for the spindle is numbered 34. As shown in each FIG. 1 and FIG. 7 it is a bearing means of such axial extent as to afford effective cantilever support for the freely extending main body of the spindle. In this embodiment the main body is of circular cross section throughout as can readily be seen from an inspection of the several views in which it appears. Adjoining its bearing supported end the spindle is equipped with the helical formation designated 36 in FIGS. 1 and 11. This formation is extended along the main body for but a fraction of its length, preferably a minor fraction as shown for reasons which will appear. In this embodiment the helical formation is constituted of a helix of round rod (detailed in FIGS. 7 and 11 only) of considerable diameter, wound at a uniform but rather coarse pitch about the circular main body of the spindle (as diagrammed in FIGS. 1 and 7) and welded thereto in the angles of tangency of the turns (as clearly shown in FIG. 11).

The hay roll forming and firming means is constituted by a circumscribing annular series of rolls made up of a lower pair 40 of fairly large diameter and an upper pair 38 of lesser diameter located respectively substantially vertically above the respective lower rolls 40. Space 42 between the upper rolls thus is considerably wider than the space 44 between the lower rolls, so providing better access for feeding in of hay from above as well as more room between rolls for auxiliary mechanisms and devices such as the wafer severing device. The rolls are of hollow section and are borne on roll axis drive shafts 46 which in turn are journalled in front and rear frame bearings 48 in the front and rear frame members 22 and 24. The peripheries of the several rolls lie at equal radial distance from the axis of the spindle and so are tangential to an approximately cylindrical space which is to be occupied by a formed and firmed hay roll.

The annular series of rolls 38, 40 is divided into two zones jointly in respect of their relationships to the auxiliary mechanisms, their relationship to the extent of the helical formation 36 on the spindle, and their functionings in the respective zones. The first is a forming and feeding zone 50 located next the driving end and defined especially by the axial extent of the helical formation 36 and the feeding action of the feeding device 86 (shortly to be described), and the second 52 is a firming zone defined by the remaining length of the rolls. A cylindrical hay roll is formed and compressed of fed in hay wrapped around the main body of the spindle and the helical formation 36 as illustrated in FIG. 11, and this formed hay roll when moved along the spindle by the helical formation 36 to points beyond the formation is confined by the much longer remaining portions of the rolls under sufficient compression and for sufficient time to firm the formed hay roll into a stable condition.

Spindle 28 with its helical formations 36 is driven clockwise and rolls 38, 40 are driven counter-clockwise from a common source of power such for example as a tractor power take off 54 and stub sprocket and shaft 56 through an intervened gearbox 58 as illustrated in FIGS. 1 and 2. FIGS. 1, 2, 3, 6 and 7 show the spindle drive as consisting of a large sprocket 60 on shaft 56, a small spindle sprocket 62, and a chain 64, whose inner reach engages sprocket 60 and whose outer reach engages 62, together with a pair of intervened idler sprockets 66 (see also FIG. 6) also engaged by the inner reach and journalled above spindle sprocket 62 on the frontally extended ends of the upper roll shafts 46. Running chain 64 over idlers 66 assures adequate chain wrap in clockwise direction for spindle sprocket 62.

FIGS. 1, 2, 4, 5, 6 and 8 make clear the drive of rolls 38, 40 from the same power shaft 56. A second chain 68 runs from sprocket 70 on the shaft 56 to the one half 72 of double sprocket 72, 74 keyed to shaft 46 of one of the lower rolls 40, thus driving that one (the right one) of the lower rolls. From the other half 74 of the double sprocket a third chain 76 makes a circuit around sprockets 78, 80 and 82 keyed to the remaining three rolls 38, 40 as shown in FIG. 5. Thus geared together the rolls all revolve counter-clockwise as shown by the applied arrows. An idler 84 keeps chain 76 at the proper tension.

A feeding device in the form of a simple open top trough 86 is supported by any suitable means, as for example welding to front frame 22, in the longitudinal plane of symmetry of the unit. Only the lower end is shown in FIG. 1. It is preferably of rectangular channeled section such as shown in FIG. 14, and is a few feet in length. The gravity feeding may be aided by hand or suitable power devices.

Near the opposite end of the machine and entered into the space 42 between rolls 38, wafer severing means of the travelling shears type is located. It is in the form of a cutting wheel 88 in the vertical plane of the axis of the spindle 28, is equipped with an annular series of transverse edge inclined cutting blades 89, and is journalled transaxially in plane 10/10 through shaft 90 to which it is pinned. The wheel is of relatively large overall diameter and a slot 91 in the rear frame member 24 accommodates it. The shaft 90 is borne in free running bearings 92 in eccentric bushings 94 which are adjustable in bearing apertures 96 in the opposite sides of rear frame 24 by means of connected radial arms 98, through which arms angle fixed bolts 99 may be changed from one bolt hole 100 to another of the series shown. (The arm 98 on one side only is shown. It is duplicated on the opposite side of the frame 24.) By such adjustment the depth of the cut of the blades 89 can be regulated. Blades 89 are welded into radial slots 103 in the periphery of wheel body 88. Slots for blades intermediate those shown are provided for additional blades if shorter cuts are desired.

In operation such units perform their functions in this effective and efficient manner. Hay being fed to the upper end of long open trough 86 by hand or otherwise, it may slide down or be pushed or otherwise conveyed down the trough substantially at the rate the unit takes it in. Distribution is effected by appropriate choice of inclination, length and depth of the trough, the rate of operation of the chosen conveying means (not shown), and the depth of the feed entered into it. In lieu of this simple (and in a sense symbolical) feeding device any of the many known infeeding and feed distributing devices may be used.

Assuming the entire machine to be empty of hay, the first of this infed material entering the forming zone between the upper rolls through the widened space 42 is engaged by the rapidly rotating helical formations 36 on spindle 28 and rapidly becomes wrapped around the spindle to the cross section of the hay roll 108 shown in FIG. 11. Once the wrapping is started and reaches the more dense condition shown in FIG. 11 the unit continues to feed itself, the revolving very rough periphery of the wrapped material in conjunction with the periphery of the top roll 38 which moves tangentially in the same direction creating a powerful infeeding nip in the region 109 (on the right, FIGS. 6 and 11) the action of which is sufficiently greater than the upwardly directed counter action of the adjoining roller 38 (on the left) alone to insure continuous infeed to the hay roll being thus formed.

Since (as clearly appears from the relative sprocket sizes) the counter-clockwise rotating rolls 38, 40 are driven from power shaft 56 at a considerably less speed than clockwise driven spindle 28 and its helical formation 36 and these hay roll engaging peripheries travel as shown by the arrows all in the same direction, they exert a retarding force on the periphery of the length of the hay roll in the forming zone and rapidly build up a rotative counter-torque which continues to rise as the hay roll becomes more and more dense and the pressure upon it by the slower moving circumscribing roll peripheries rises. As can clearly be seen from FIG. 11, the wrap of the hay about the helical formation 36 results in a relatively deep complemental V-shaped helical interior groove or furrow 110 (so to speak) extending the length of the interior periphery 112 of the hay roll. Under sufficient counter-torque, hay roll reaction and resulting clockwise rotation, the helical formation 36 progressively moves the formed hay roll 108 along the spindle at a substantially uniform axial rate so long as substantially uniform feeding is continued.

The movement of the hay roll is from the forming zone 50 defined jointly by the feeding and the helix devices into the firming zone 52 where the spindle cross section is perferably circular and may be as shown entirely free of helical formation, though with some materials it may be found advantageous to extend the helical formation for a short distance into this zone. The result is that the formed hay roll 108 in its extent into this zone is free from other than frictional engagement with the circular sectioned spindle body to be rotated about it. Its r.p.m. becomes determined by the r.p.m. of the circumscribing forming and firming rolls. Importantly the axial movement may diminish or stop when the feeding is unduly diminished or is stopped, only to be promptly resumed at uniform progression when normal feeding is resumed. This takes place without interruption in or disruption of hay roll integrality. The underlying reason for this is the predominant control of the hay roll r.p.m. by the circumscribing rolls of the firming zone. Under diminished or stopped feeding the helical formation, being of limited length, feeds the complete formed fore portion of the hay roll within the forming zone on into the firming zone until there engages the after portion too few helical turns to develop sufficient axial thrust to farther advance it. Thereupon the after end of the formed trough 110 is shifted around or destroyed. Resumption of feeding immediately rebuilds it. Rebuilding takes place as additional hay becomes wrapped about this after portion (still in the forming zone) and is continued in revolution by the circumscribing roll. When the machine is stopped and power cut off, as at the end of a given run, when it is again started this same prompt resumption of feeding takes place.

Feeding being continued the formed hay roll continues to be progressed through the forming zone 52 to the delivery end of the machine. The firming zone being of relatively great length as compared with the forming zone the hay roll is subjected to progressively extended compression and firming action by the rolls in this zone. Under the opposing frictional and other surface resistances of the high speed circular sectioned spindle on the one hand and the considerably slower clockwise rotation of the hay roll under the command of the slower speed rolls 38, 40 on the other, turns of the roll are also gradually tightened upon each other by the resulting relative rotation to the point when most if not all of the slack occasioned by the hay roll's leaving the helical formation 36 (the circular spindle section having a periphery of less extent than the length of the turns around the helix 36) is taken up and the hay roll is made more dense and of greater homogeneity. Due to the strong axial component of spindle and roll resistances the hay roll in this process also undergoes considerable axial compression and some degree of axial foreshortening. The hay roll becomes "cured" (so to speak) during relatively long dwell time in the firming zone under these roll and spindle actions and reactions and the internal heat they generate, and thus is "firmed" to a condition of lasting stability of form.

As the progressing and now firmed hay roll nears the terminal ends of the roll near transaxial plane 10/10 it engages first one and then another and another of the transaxial travelling wafer severing blades 89 of wheel 88, with the result that the hay roll is cut transaxially into wafers (or pellets as they may be called) of uniform axial length. The blades may be sharpened knife-like or provided with cutting teeth saw-like. Through the proper adjustment of eccentric bearing bushings 94 the cut may be made clean all the way to the spindle body 28. When too great number of blades is used the extreme depth of cut becomes limited by the greater tendency of the cut wafers to wedge between the blades. A lesser number of blades on the other hand increases the axial dimensions of the wafer at the same time that it eliminates the tendency to wedging action. Such a cutting wheel is truly a travelling axial shears, and guarantees uniformity of axial wafer dimension (or axial thickness) irrespective of variations in the rate of continuity of hay roll progression which variations in the feeding may bring about. This is a highly desirable characteristic in such machines.

The severing wheel 88 is, of course, rotated in action by axial pressure of the transaxial faces of the wafers being severed upon the severing blades 89. Cutting blades 89 beyond plane 10/10 shove the several wafers between them out from the ends of rolls 38, 40 and beyond the free end 32 of spindle 28 where they drop to be received by any suitable receptacle or conveyor means. Neither of these is shown.

When a multiple number of these machine units are combined to form a bank of units to constitute a machine of large tonnage capacity they may be combined as shown in FIGS. 12 and 13. The U-shaped end frames are dispensed with in favor of transversely extended bearing supporting end walls 120, the front such wall only being shown in these partial views. Of course, there will be provided similar rear bearing supporting walls. Flanking side walls 122 house-in the entire bank. Except for the outermost rolls 38, 40 each vertically superposed pair 38, 40 (or to express it in another way each individual roll) coacts commonly with each of two adjoining spindles 128, thus very approximately having the number of forming and firming rolls which would be required if each spindle were provided with four rolls individual to itself as in the single unit the subject of FIGS. 1 to 11. Recognition of the facts appearing in FIGS. 1 to 11 that all spindles rotate clockwise and all rolls counter-clockwise reveals at once the reasons why this consolidation is possible. This consolidation and dual functioning of adjacent rolls achieves great saving in weight and first cost plus better feed distribution for the bank at large, for there is no idle space between spindles. All spaces between the adjoining spindles are occupied by functionally active rollers. Thus feed waste between the units is minimized.

FIGS. 12 and 13 also depict a feasible gear drive for the bank of units as a modification of or alternative to the sprocket and chain drive of FIGS. 1 to 8. One of the spindles 128 is extended to afford axial room for its connection to a source of power (not shown). Each spindle 128 is provided with a pinion gear 130 having a very wide face. In a fronted plane 132 near the power extension 128 diagonally opposite lower and upper gears 134, 136 respectively keyed to left lower and right upper roll mounting shafts 46, mesh with the pinion gears 130 and drive the lower left large rollers 40 and the upper right smaller rolls 38. In an adjoining plane 138 lower and upper gears 140, 142 of the same size as gears 134 and 136 are keyed to the right lower and left upper roll shafts 46 which bear the remaining rolls of the bank, and in turn mesh in this plane 138 with the same wide faced pinions 130. This engagement of the gears in spaced planes provides room for the use of the larger gears 134 and 140 and for choice of gear sizes without danger of their interference with each other, as would be the case if all gears engaged in one and the same plane. As in the case of the sprocket and chain drive there is thus attained the use of smaller rolls 38 at the top of the bank and larger rolls 40 at the bottom having the same peripheral velocities.

The manner in which the use of the continuous method of this invention results in the advantages set forth in the preamble should be clear from the foregoing description. It can be summarized briefly. Continuous axial progression of the hay while it is being formed combined with a uniform rate of feeding of the material insures smooth unbroken and unweakened hay rolls of substantially uniform density throughout. The deriving of progression of this character through a continuously applied axial force set up through relative rotation between spindle and hay roll attains this result even though the feeding rate is reduced or stopped for a time, for in the latter event progression is also slowed down or stopped while a portion at least of the hay roll is still under the forming operation in the forming zone. Overlapping axial wrapping of this portion ensues as soon as the normal uniform feeding rate is resumed. The hay roll again progresses as soon as the newly formed rear end develops adequate length and firmness of helical trough 110 (FIG. 11). Limiting axial extent of application of axial force within or substantially to the length of the forming zone gives better opportunity for first stage tightening up annularly and axially within the forming zone of all turns of the wrap which constitutes the roll. A second stage of annular and axial tightening takes place over a longer time interval in the more extended firming zone, while continuous axial progression combined with continuous metering cutting in the region of the completed firming near the end of this second stage assures wafers of maximum stability and uniformity of dimension.

The dimensions of the demonstrating machine successfully tested are the following. Spindle and circumscribing rolls of a length about 40". Spindle body O.D. ¾". Helical formations of ⅜" rod of 1¼" pitch or 10 to 15 inches of spindle length. Upper rolls 3" O.D., lower rolls 4". R.p.m.; of spindle 963, of upper rolls 385, of lower rolls 289, of the hay roll itself 514, relative r.p.m. of hay roll and spindle 419. Cutting blade edges spaced about 2½". Designed capacity one ton per hour per spindle. Tests thus far lead one to believe that all r.p.m. can be increased 50% and the capacity per spindle correspondingly increased.

The annexed claims, interpreted accordingly, are intended to comprehend all such modifications as well as the method and machine per se of the instant disclosure.

Having thus described our invention, what we claim is:

1. A hay wafering machine comprising a frame, bearing means carried by said frame, an elongated spindle having one end journalled in said bearing means, said spindle having an elongated body extending from said bearing means and terminating in an unsupported second end, an elongated member extending along and around a portion of said spindle adjacent said bearing means in the form of a helical flight, the axial portion of said spindle about which said flight extends constituting a hay roll forming zone and the portion of said spindle free of said flight constituting a hay roll firming zone, a series of elongated rolls journalled on said frame and extending parallel to said spindle, said rolls being disposed concentrically about said spindle and spaced radially outwardly from the spindle to provide an annular space between the periphery of said spindle and the peripheries of said rolls, drive means continuously rotating said spindle in a given direction and at a given speed and simultaneously continuously rotating said rolls in the direction opposite to the direction of rotation of said spindle and at a slower speed than the speed of said spindle, feed means on said frame for feeding hay into said forming zone between said rolls at said one end of said spindle to be wrapped about the spindle and flight into a tightly wrapped continuous hollow cored roll of hay whose maximum diameter is limited by engagement of the outer periphery of the hay roll with said series of elongated rolls, said hay roll being progressed axially along said spindle into and through said firming zone by the coaction thereon of said flight and said series of rolls, said spindle extending substantially the full length of said rolls so as to form said hollow cored roll, and knife means carried by said frame at said second end of said spindle operable to sever the firmed hay roll transaxially into wafers.

2. A machine according to claim 1 wherein said spindle is of circular cross-section and wherein said helical flight has a depth dimension approaching that of the radius of the main body of the spindle and is formed upon that main body.

3. A machine according to claim 1 in which the helical flight is of a pitch which spaces its crests so widely apart axially of the spindle as to enable the hay wrappingly engaging the crests of the flight also to engage the bottoms of the troughs between crests.

4. A machine according to claim 1 in which the helical flight consists of rod of circular cross section wrapped into the form of a helix contacting the surface of said spindle and weld means fixing said flight to said spindle.

5. A machine according to claim 1 wherein said spindle is of circular cross-section and wherein said helical flight is possessed of crests of such height above the bottoms of the troughs between its crests as to give the depth of the helix a dimension approximating the radius of said spindle.

References Cited

UNITED STATES PATENTS

| | | | |
|---|---|---|---|
| 558,171 | 4/1896 | Griffin | 100—86 |
| 651,722 | 6/1900 | Murphy | 100—95 |
| 657,028 | 8/1900 | Pace | 100—89 X |
| 704,698 | 7/1902 | Edison. | |
| 799,175 | 9/1905 | Luebben | 100—79 X |
| 862,105 | 7/1907 | Reagan | 100—40 |
| 961,997 | 6/1910 | Ball et al. | 100—86 |
| 963,775 | 7/1910 | Killman | 100—78 X |
| 963,823 | 7/1910 | Spoon | 100—82 X |
| 983,086 | 1/1911 | Reagan | 100—86 X |
| 1,145,630 | 7/1915 | Taft | 100—40 |
| 1,221,594 | 4/1917 | Richman. | |
| 1,238,981 | 8/1917 | Barton | 100—95 |
| 1,766,427 | 6/1930 | Clelland | 83—331 X |
| 2,207,795 | 7/1940 | Grimm. | |
| 2,629,341 | 2/1953 | Rice | 83—308 |
| 2,716,318 | 8/1955 | Skromme | 56—1 |
| 2,893,308 | 7/1959 | Bodisch | 100—86 X |
| 3,105,435 | 10/1963 | Kendzia | 100—172 X |
| 3,191,366 | 6/1965 | Molitorisz | 56—1 |
| 3,244,088 | 4/1966 | Bushmeyer et al. | 100—89 |
| 3,269,098 | 8/1966 | Bushmeyer et al. | 56—1 |
| 3,316,694 | 5/1967 | McColly et al. | 100—89 X |
| 3,323,445 | 6/1967 | Bushmeyer et al. | 100—86 |

BILLY J. WILHITE, *Primary Examiner.*